US011911880B2

(12) United States Patent
Steen et al.

(10) Patent No.: US 11,911,880 B2
(45) **Date of Patent: *Feb. 27, 2024**

(54) PIPE WRENCH WITH IMPROVED DESIGN FOR SIDE BITE

(71) Applicant: APEX BRANDS, INC., Apex, NC (US)

(72) Inventors: Noah Thomas Steen, Apex, NC (US); Kelsey David Gilmore, Fuquay-Varina, NC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,615

(22) Filed: Oct. 25, 2022

(65) Prior Publication Data

US 2023/0041475 A1 Feb. 9, 2023

Related U.S. Application Data

(63) Continuation of application No. 17/417,275, filed as application No. PCT/US2019/067802 on Dec. 20, 2019, now Pat. No. 11,511,398.

(Continued)

(51) Int. Cl.

*B25B 13/50* (2006.01)
*B25B 7/02* (2006.01)

(52) U.S. Cl.

CPC ............ *B25B 13/5058* (2013.01); *B25B 7/02* (2013.01)

(58) Field of Classification Search

CPC ......... B25B 13/08; B25B 13/12; B25B 13/22; B25B 13/48; B25B 13/50; B25B 13/5008;

(Continued)

(56) References Cited

U.S. PATENT DOCUMENTS

| | | | |
|---|---|---|---|
| D45,919 | S | 6/1914 | Thomsoit |
| 3,894,451 | A | 7/1975 | Putsch |

(Continued)

FOREIGN PATENT DOCUMENTS

| | | | |
|---|---|---|---|
| DE | 102017109228 B3 | 8/2018 | |
| EP | 0999919 A1 | 5/2000 | |

(Continued)

OTHER PUBLICATIONS

Office Action issued in corresponding Canadian Application No. 3,153,857 dated Jun. 2, 2023.

(Continued)

*Primary Examiner* — Robert J Scruggs
(74) *Attorney, Agent, or Firm* — BURR & FORMAN LLP

(57) ABSTRACT

A hand tool includes a handle section, a working end operably coupled to the handle section, and a jaw assembly disposed at the working end. The jaw assembly includes a movable jaw and a fixed jaw. A span defined between the movable jaw and the fixed jaw is adjustable. Each of the movable jaw and the fixed jaw includes an array of teeth defined by ridges that extend substantially parallel to each other. The array of teeth on each of the fixed jaw and the movable jaw includes a first set of teeth having a first width and a first depth, and a second set of teeth having a second width and a second depth. The first depth is less than the second depth and the first width is less than the second width.

20 Claims, 10 Drawing Sheets

Related U.S. Application Data

(60) Provisional application No. 62/785,848, filed on Dec. 28, 2018.

(58) Field of Classification Search
CPC ............ B25B 13/5016; B25B 13/5033; B25B 13/5041; B25B 13/5058; B25B 13/58; B25B 7/00; B25B 7/02; B25B 7/04; B25B 7/10; B25B 7/12; B25B 7/18; B25B 23/00
See application file for complete search history.

(56) References Cited

U.S. PATENT DOCUMENTS

| | | | | |
|---|---|---|---|---|
| D344,224 | S | 2/1994 | Imhoff | |
| 5,697,114 | A | 12/1997 | McIntosh et al. | |
| D398,497 | S | 9/1998 | Gomas | |
| 5,904,078 | A | 5/1999 | Gustafson | |
| D418,030 | S | 12/1999 | Khachatoorian | |
| D418,031 | S | 12/1999 | Khachatoorian | |
| D424,394 | S | 5/2000 | Lamond | |
| 6,199,459 | B1 * | 3/2001 | Azkona | B25B 7/10 81/413 |
| D457,040 | S | 5/2002 | Hirschfeld | |
| D537,307 | S | 2/2007 | Wang | |
| D537,308 | S | 2/2007 | Wang | |
| D543,812 | S | 6/2007 | Burry | |
| D543,815 | S | 6/2007 | Metcalf | |
| D588,890 | S | 3/2009 | Ibarrondo | |
| D589,315 | S | 3/2009 | Hermann | |
| D619,869 | S | 7/2010 | Garcia | |
| D619,870 | S | 7/2010 | Garcia | |
| D730,707 | S | 6/2015 | Reedy | |
| D757,510 | S | 5/2016 | Caglar | |
| D768,450 | S | 10/2016 | Reedy | |
| D845,098 | S | 4/2019 | Moyer | |
| 10,583,541 | B2 | 3/2020 | Bridges | |
| 10,744,622 | B2 | 8/2020 | Hermann | |
| D966,852 | S | 10/2022 | Steen | |
| D967,684 | S | 10/2022 | Fu | |
| D968,182 | S | 11/2022 | Chen | |
| 11,511,398 | B2 * | 11/2022 | Steen | B25B 13/5058 |
| 2003/0233915 | A1 | 12/2003 | Takasaki | |
| 2004/0016325 | A1 | 1/2004 | Smith | |
| 2004/0181880 | A1 | 9/2004 | McIntosh | |
| 2006/0086212 | A1 * | 4/2006 | Hsieh | B25B 13/14 81/186 |
| 2009/0178518 | A1 | 7/2009 | Buchanan et al. | |
| 2017/0066112 | A1 * | 3/2017 | Herrmann | B25B 7/10 |

FOREIGN PATENT DOCUMENTS

| | | | |
|---|---|---|---|
| EP | 1023972 | A2 | 8/2000 |
| WO | 20212069511 | A1 | 10/2021 |

OTHER PUBLICATIONS

Examination Report issued in corresponding Australian Application No. 2022201767 dated Jun. 21, 2023.
Office Action issued in corresponding Chinese Application No. 202210664540.4 dated May 27, 2023.
Extended European Search Report from corresponding European Application No. 19904300.1 dated Jul. 5, 2022.
Office Action issued in Chinese Application No. 201980086813.8 dated Oct. 11, 2021.
Office Action issued in related Canadian Application No. 3125322 dated Aug. 19, 2021.
Office Action issued in related Australian Application No. 2019417576 dated Jul. 5, 2021.
International Search Report and Written Opinion issued in International Application No. PCT/US2019/067802 dated Apr. 1, 2020.

* cited by examiner

PIPE WRENCH WITH IMPROVED DESIGN FOR SIDE BITE

CROSS REFERENCE TO RELATED APPLICATION

This application is a continuation of U.S. application Ser. No. 17/417,275 filed on Jun. 22, 2021, which is a U.S. national phase entry of international application number PCT/US2019/067802 filed on Dec. 20, 2019, which claims priority to U.S. application No. 62/785,848 filed Dec. 28, 2018, the entire contents of each are hereby incorporated by reference in its entirety.

TECHNICAL FIELD

Example embodiments generally relate to hand tools and, in particular, relate to a pipe wrench with improved capability to engage pipe or other media at other than a typical 90 degree angle.

BACKGROUND

Hand tools are commonly used across all aspects of industry and in the homes of consumers. Hand tools are employed for multiple applications including, for example, tightening, component joining, and/or the like. For some plumbing applications, and other pipe joining applications, a pipe wrench with one movable and one fixed jaw may be preferred. These familiar hand tools typically place the moveable jaw at a distal end of the pipe wrench and allow the span of the pipe wrench (i.e., the space between the fixed jaw and the movable jaw) to be adjusted by moving the movable jaw farther away from the fixed jaw or closer to the fixed jaw.

Each of the fixed jaw and the movable jaw typically have an array of teeth that lie in a plane with each other. The array of teeth in the fixed jaw is generally in a plane that is substantially parallel to the plane in which the array of teeth in the movable jaw over the range of spans that are achievable for the pipe wrench. The profile of each array of teeth is generally consistent over the longitudinal length of each array. In other words, the length, width and height of the ridges that form the teeth are generally of the same size in order to ensure that the arrays stay substantially parallel to each other over the range of spans.

This arrangement works quite well for enabling the pipe wrench to grip or get a bite on pipes that extend between the jaws at an angle that is substantially perpendicular to the longitudinal length of the pipe wrench, while ensuring that many different pipe sizes can be gripped as the span of the wrench is adjusted. However, this arrangement is not very useful for situations where limited access to the pipe (e.g., due to working in low access areas or where obstructions to natural turning of the wrench prevent gripping the pipe at a 90 degree angle relative to the longitudinal length of the pipe wrench). These situations may be considered to be instances in which it is desirable to get a “side bite” on the pipe instead of the normal 90 degree bite or grip. In these side bite scenarios, the teeth will often slide off the pipe or gall the surface of the pipe.

Thus, it may be desirable to develop an improved design for pipe wrenches relative to side bite scenarios such as those described above.

BRIEF SUMMARY OF SOME EXAMPLES

In an example embodiment, a hand tool may be provided. The hand tool may include a handle section, a working end operably coupled to the handle section, and a jaw assembly disposed at the working end. The jaw assembly may include a movable jaw and a fixed jaw. A span defined between the movable jaw and the fixed jaw may be adjustable. Each of the movable jaw and the fixed jaw may include an array of teeth defined by ridges that extend substantially parallel to each other. The array of teeth on each of the fixed jaw and the movable jaw may include a first set of teeth having a first width and a first depth, and a second set of teeth having a second width and a second depth. The first depth may be less than the second depth and the first width is less than the second width.

In another example embodiment, a jaw assembly for a hand tool may be provided. The jaw assembly may include a movable jaw and a fixed jaw. A span defined between the movable jaw and the fixed jaw may be adjustable. Each of the movable jaw and the fixed jaw may include an array of teeth defined by ridges that extend substantially parallel to each other. The array of teeth on each of the fixed jaw and the movable jaw may include a first set of teeth having a first width and a first depth, and a second set of teeth having a second width and a second depth. The first depth may be less than the second depth and the first width may be less than the second width.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 1:
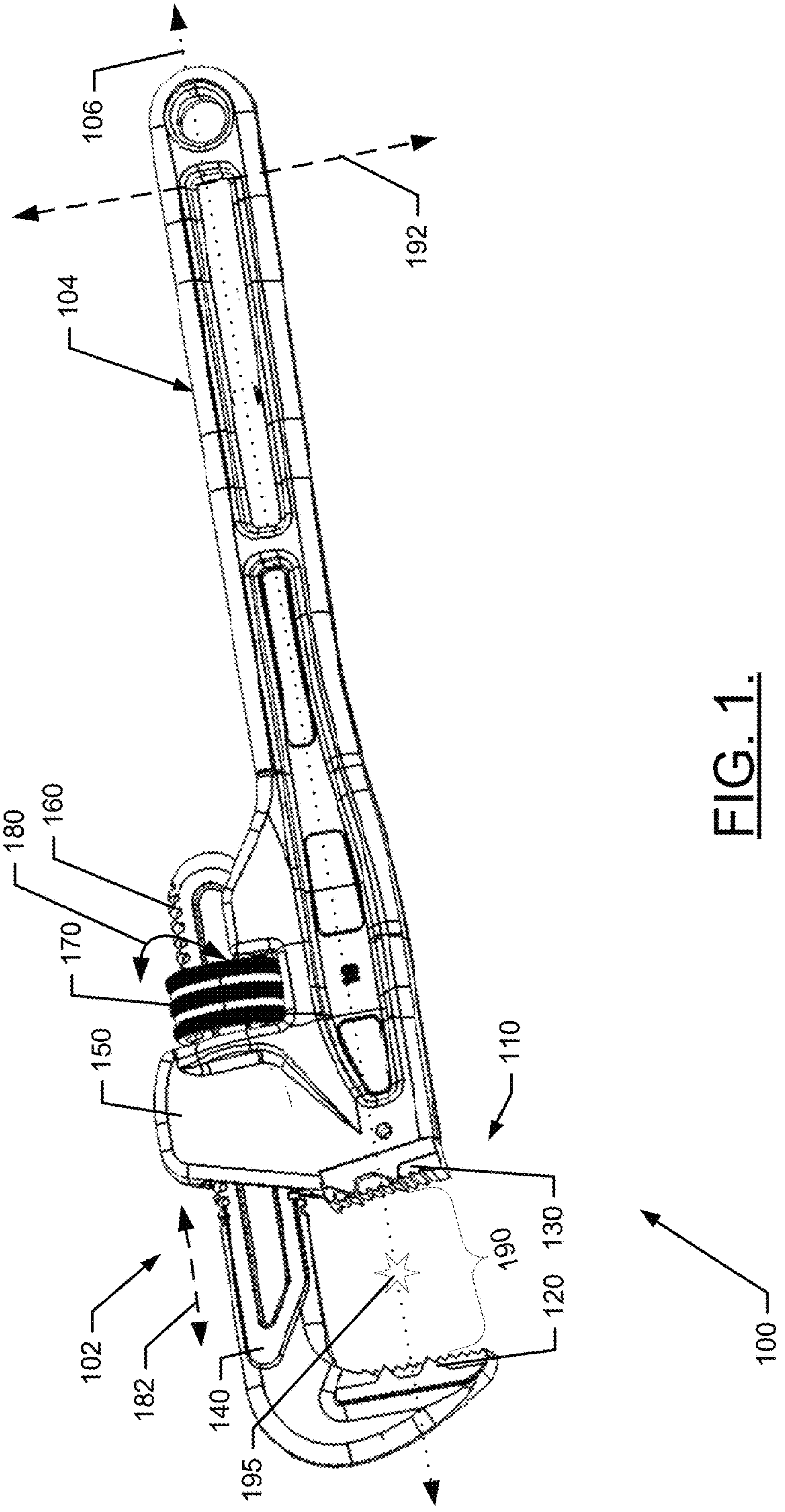
FIG. 1 illustrates a perspective view of a hand tool with an improved jaw assembly according to an example embodiment.
Figure 2:
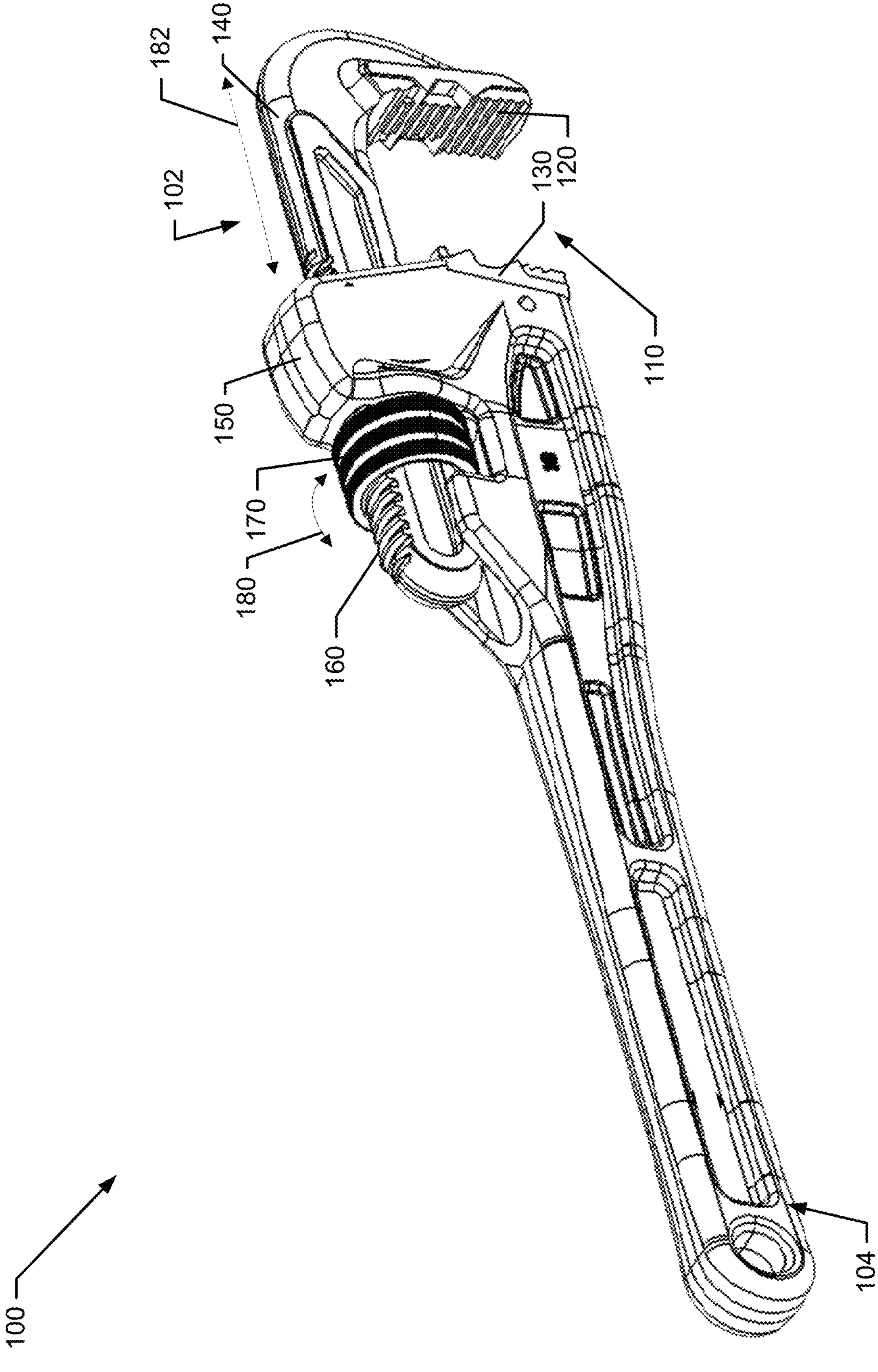
FIG. 2 is another perspective view of the hand tool of FIG. 1 in accordance with an example embodiment.
Figure 5:
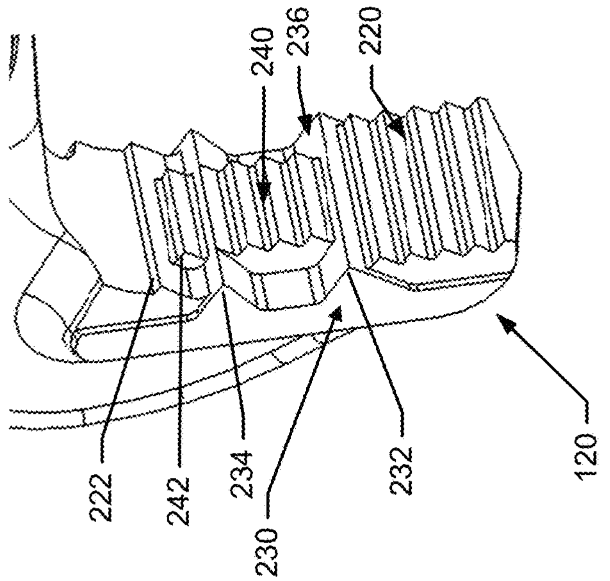
Figure 4:
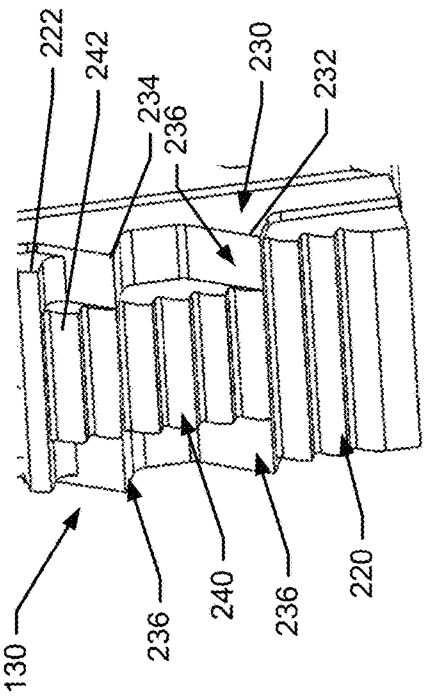
Figure 6:
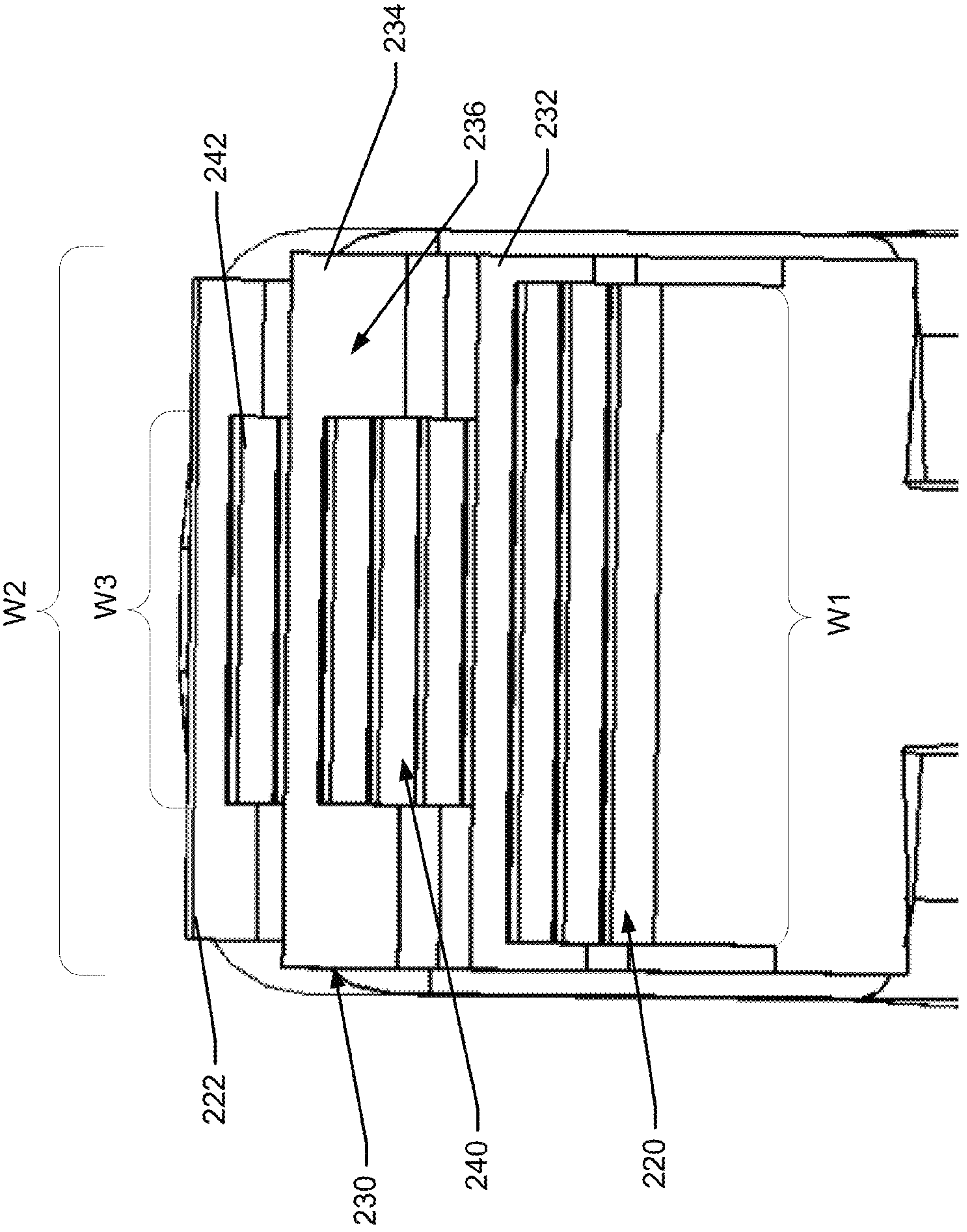
Figure 7:
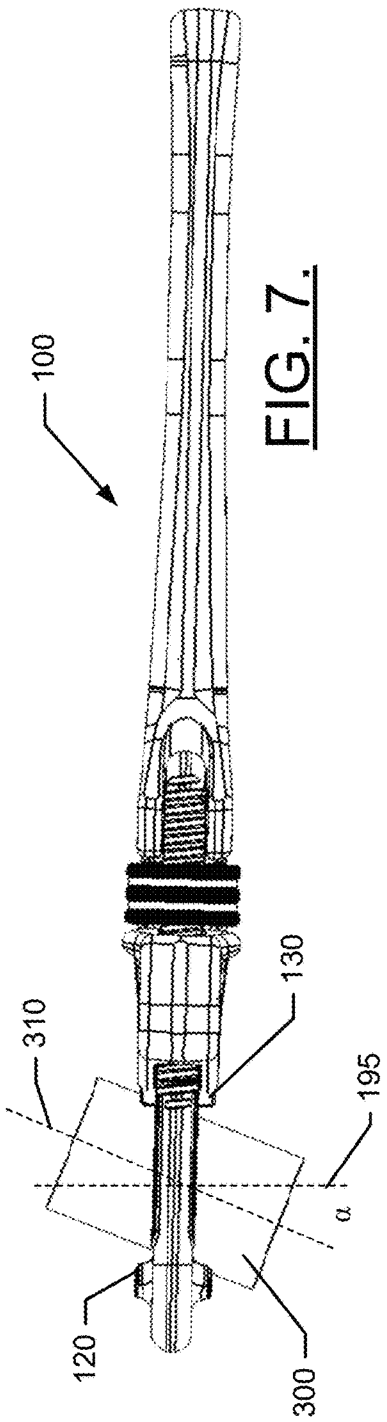
Figure 8:
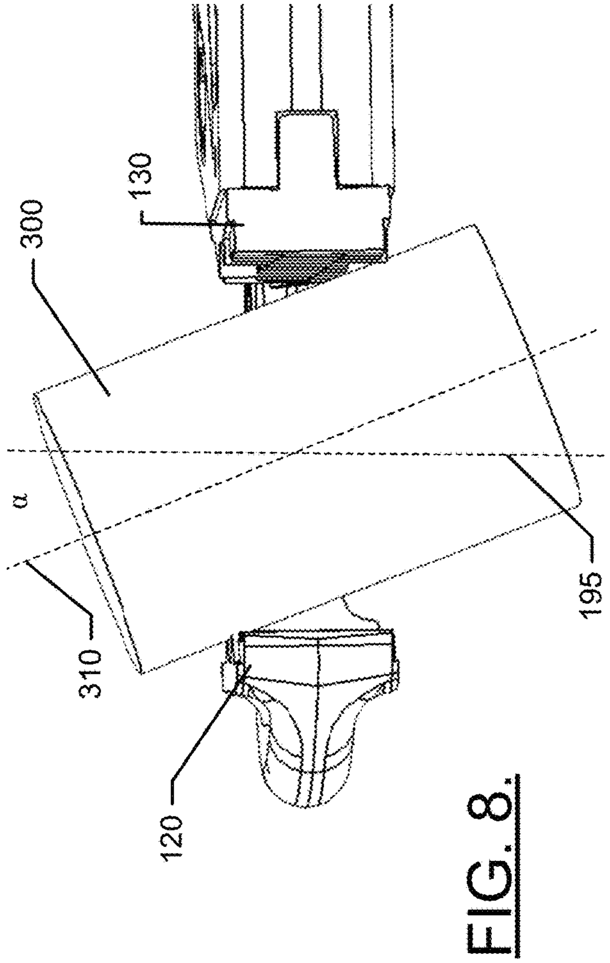
Figure 9:
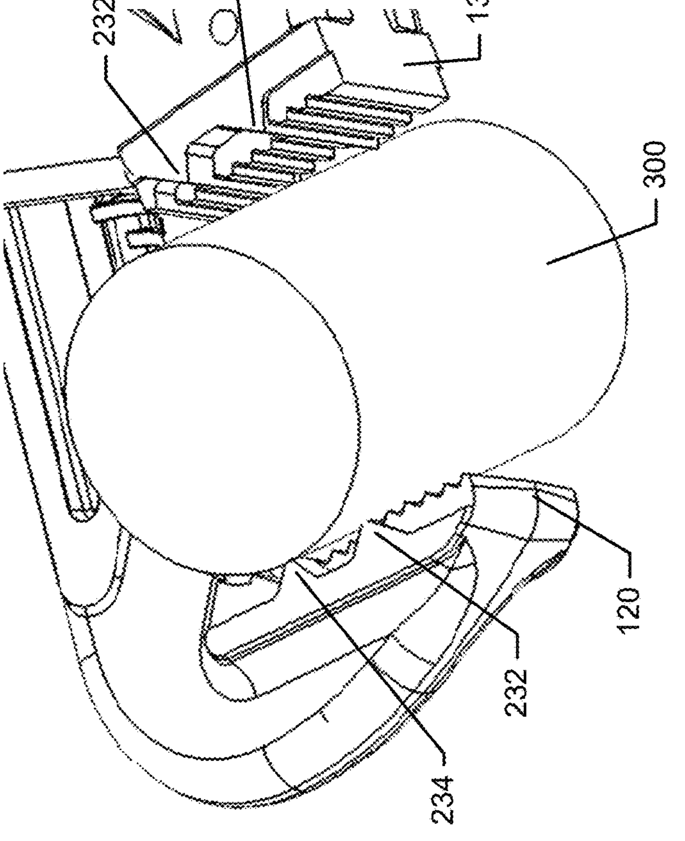
Figure 10:
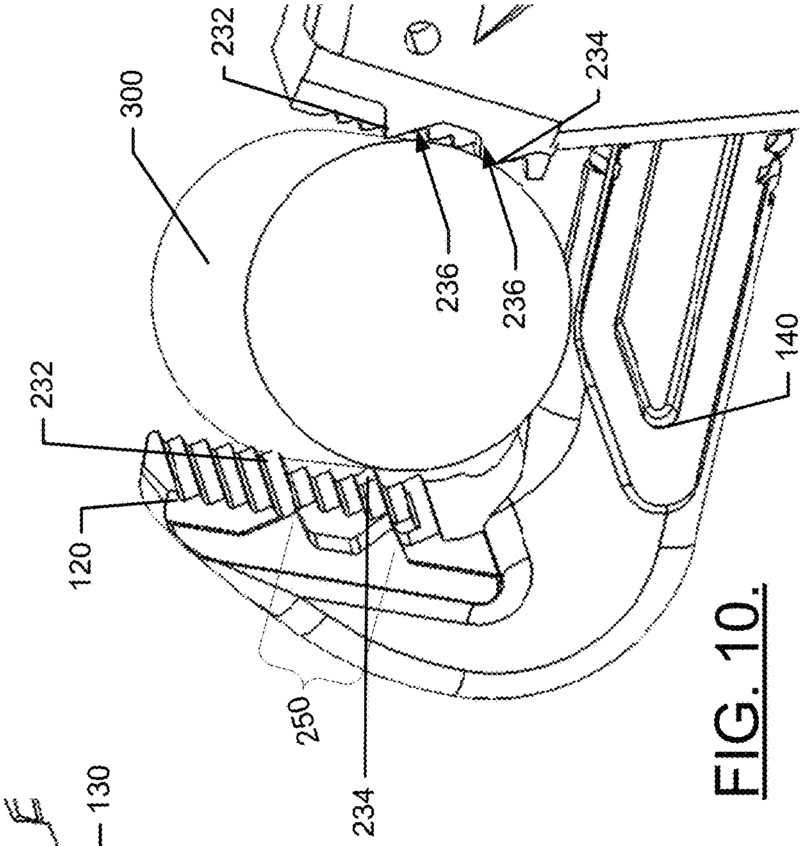
Figure 11:
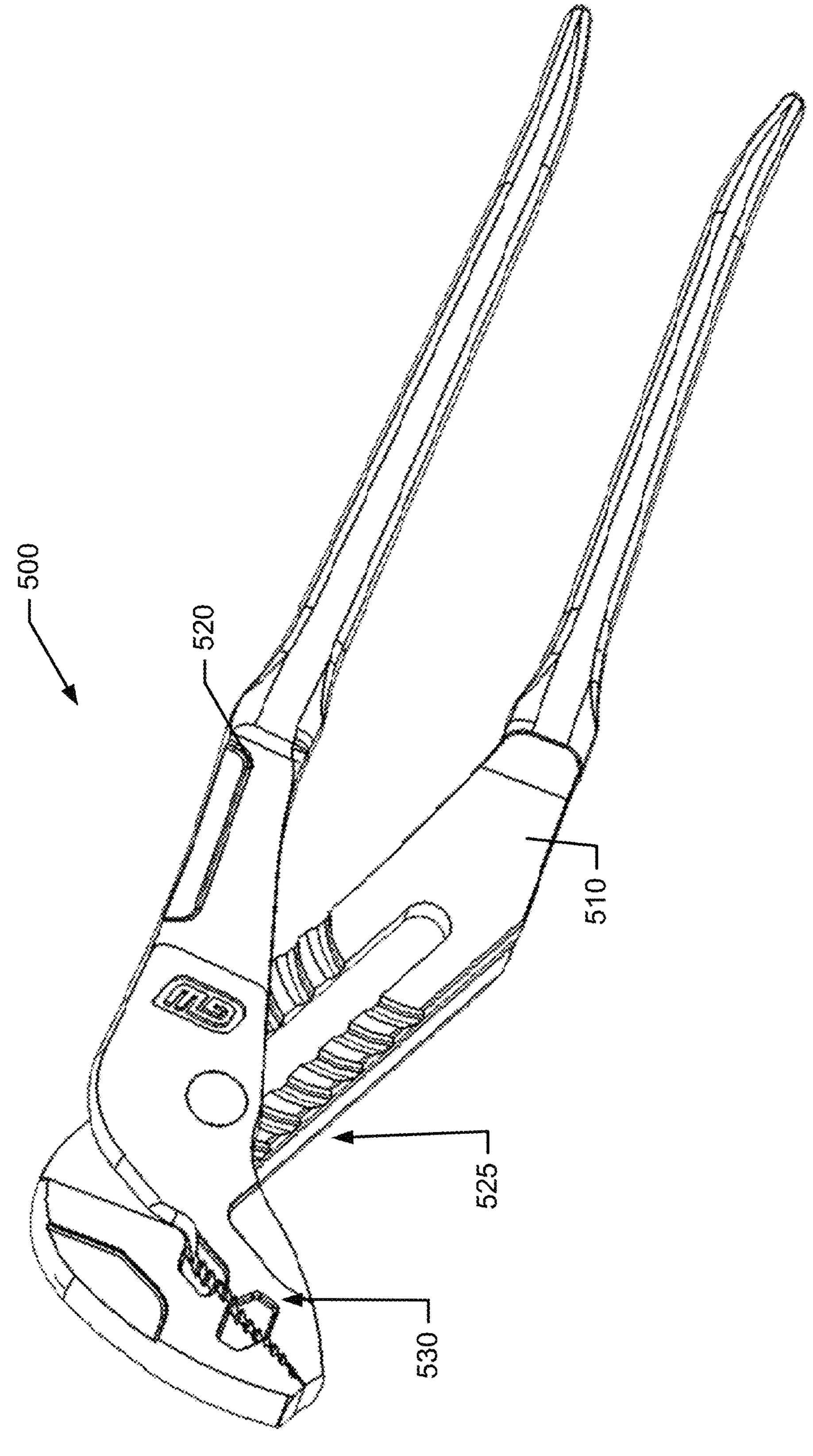
Figure 12A:
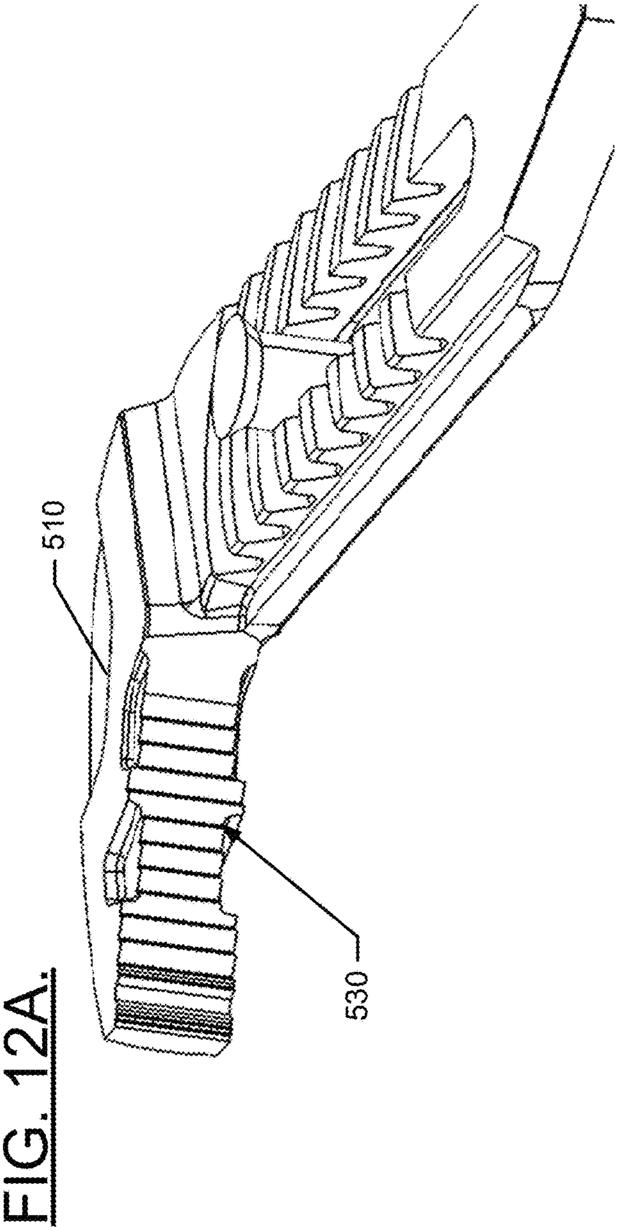
Figure 12B:
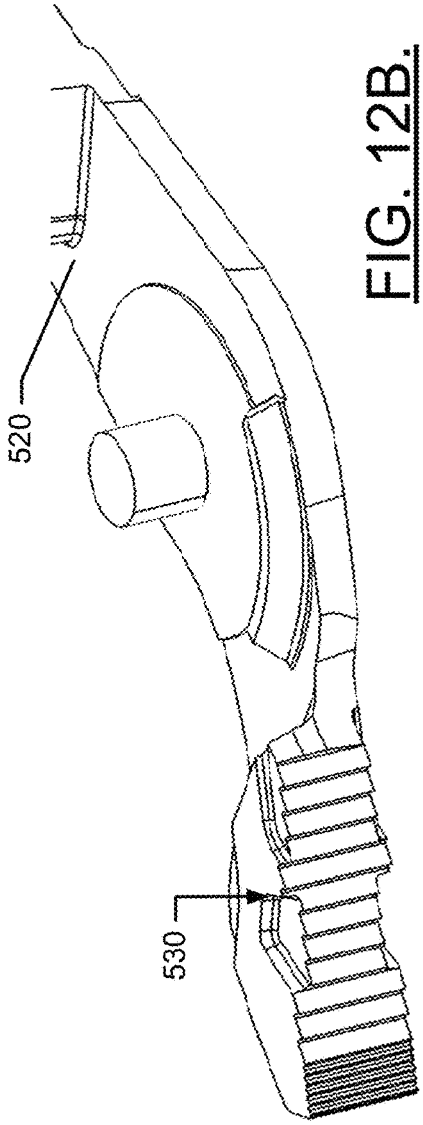
Figure 13:
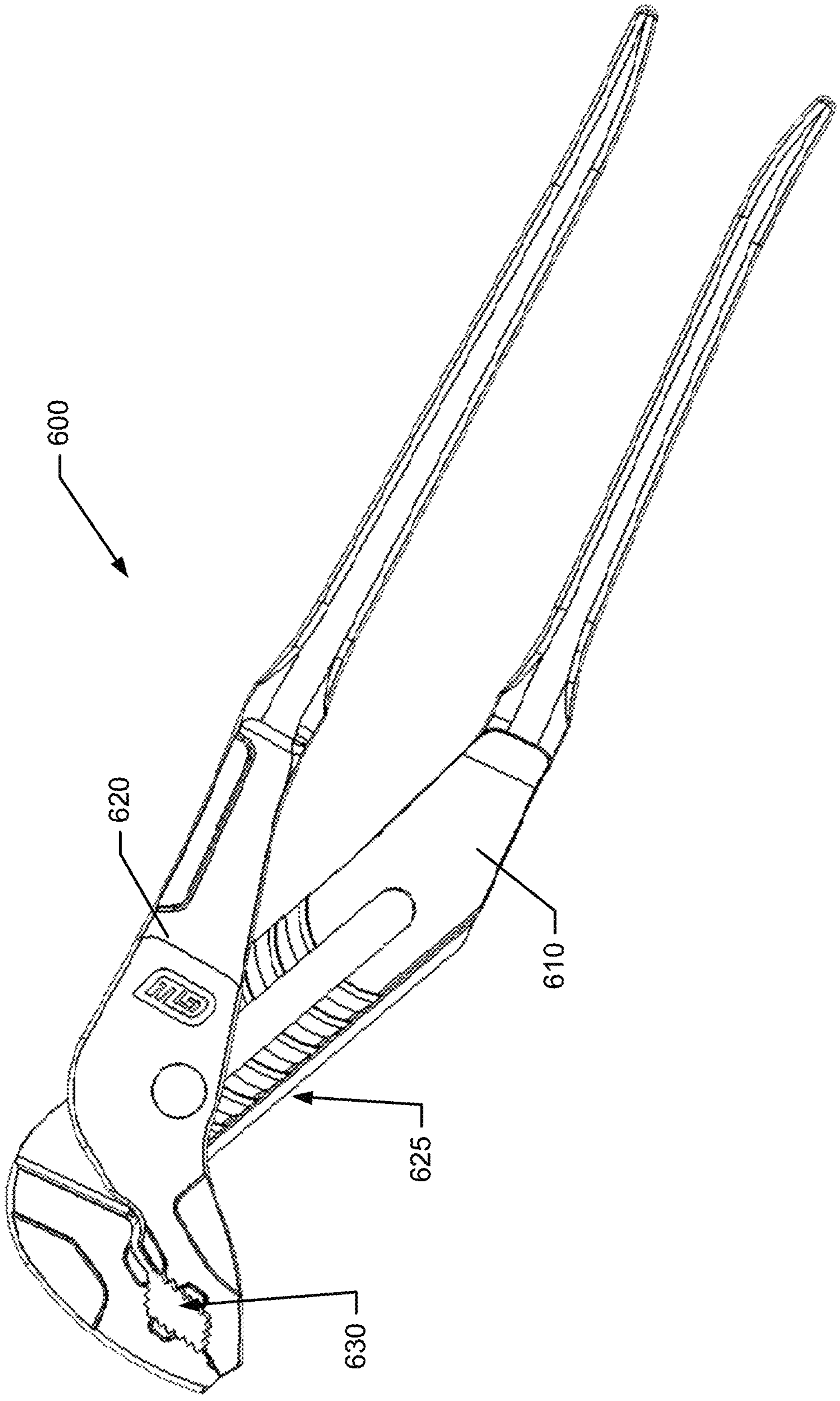
Figure 14A:
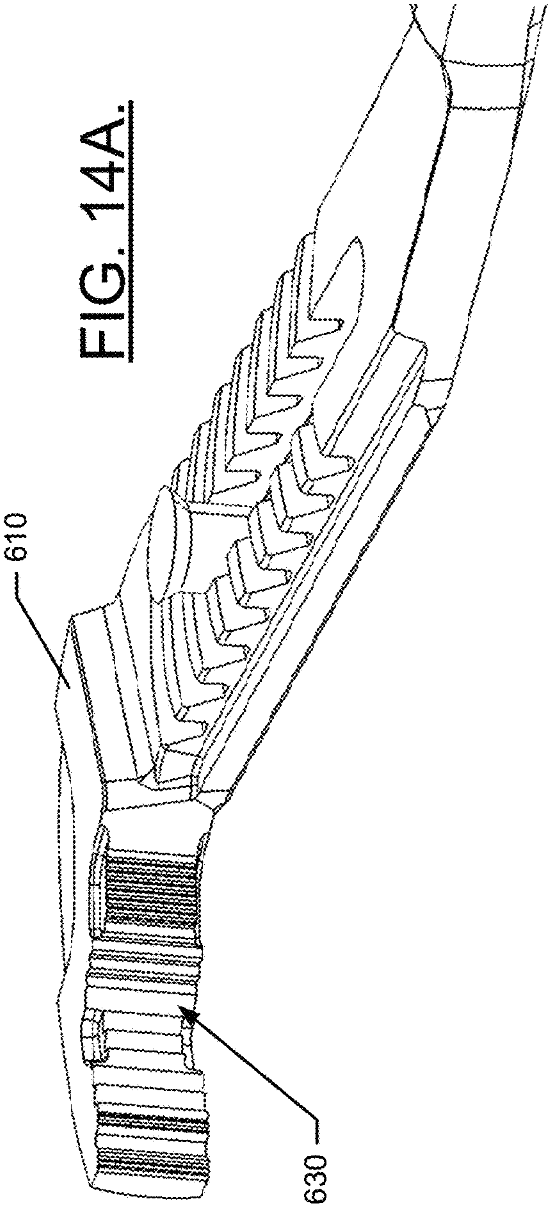
Figure 14B:
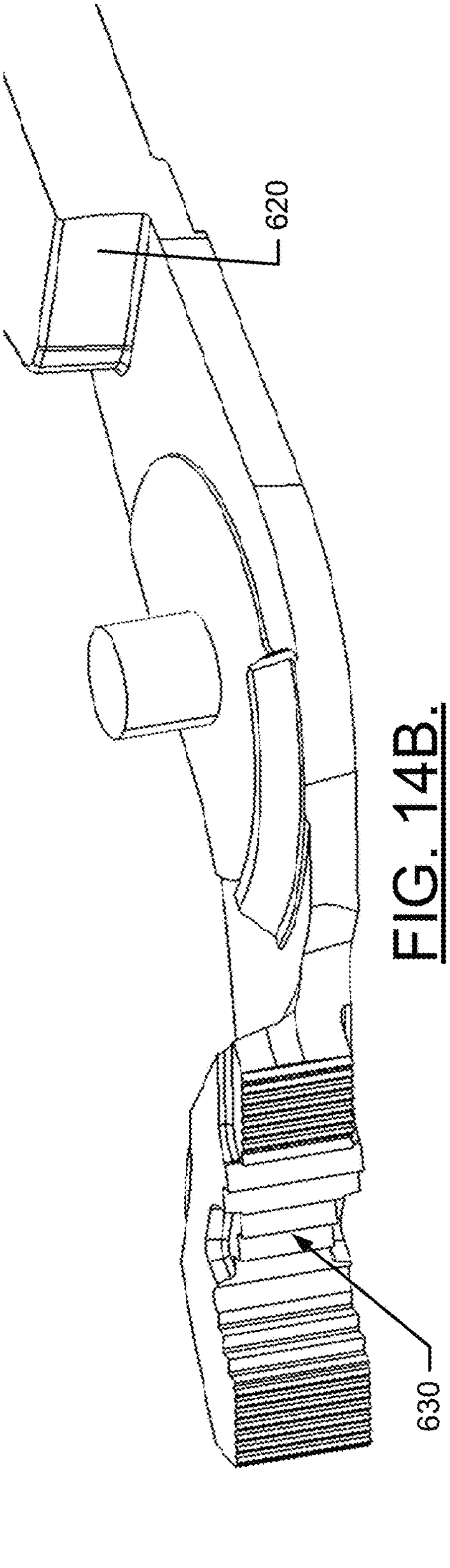

FIG. 4 a perspective view of the fixed jaw of the hand tool of FIGS. 1 and 2 in accordance with an example embodiment;

FIG. 5 is a perspective view of the movable jaw of the hand tool of FIGS. 1 and 2 in accordance with an example embodiment;

FIG. 6 is a front perspective view of an array of teeth of one of the jaws in accordance with an example embodiment;

FIG. 7 is a top view of the hand tool with a side bite on media according to an example embodiment;

FIG. 8 illustrates a bottom view of the hand tool with the side bite on the media according to an example embodiment;

FIG. 9 illustrates a left side, perspective view of the hand tool with the side bite on the media according to an example embodiment;

FIG. 10 illustrates a right side, perspective view of the hand tool with the side bite on the media according to an example embodiment;

FIG. 11 illustrates a perspective view of an adjustable grip pliers with straight jaws in accordance with an example embodiment;

FIG. 12A illustrates a perspective view of a top jaw of the pliers of FIG. 11 in accordance with an example embodiment;

FIG. 12B illustrates a perspective view of a bottom jaw of the pliers of FIG. 11 in accordance with an example embodiment;

FIG. 13 illustrates a perspective view of an adjustable grip pliers with a V-shaped recessed portion in the jaws in accordance with an example embodiment;

FIG. 14A illustrates a perspective view of a top jaw of the pliers of FIG. 13 in accordance with an example embodiment; and FIG. 14B illustrates a perspective view of a bottom jaw of the pliers of FIG. 13 in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a hand tool such as a pipe wrench or pliers with an improved design that enables the pipe wrench to effectively grasp media that is not substantially perpendicular to the longitudinal axis of the hand tool. As used herein, the grasping of media (e.g., a pipe) within the span of the pipe wrench where the media is not substantially perpendicular to the longitudinal axis of the pipe wrench will be referred to as a "side bite" situation, or simply as "side bite." FIGS. 1-6 show various views or portions of one example of a pipe wrench capable of grasping media in the side bite situation. FIGS. 7-10 further illustrate the pipe wrench actually having a side bite on a pipe. Meanwhile, FIGS. 11-14 illustrate examples of hand tools other than pipe wrenches. In this regard, FIGS. 11 and 12 illustrate an adjustable grip pliers with straight jaws and FIGS. 13 and 14 illustrate an adjustable grip pliers with a V-shaped recessed portion in the jaws. FIG. 12 is defined by FIGS. 12A and 12B and FIG. 14 is defined by FIGS. 14A and 14B.

Figure 3:
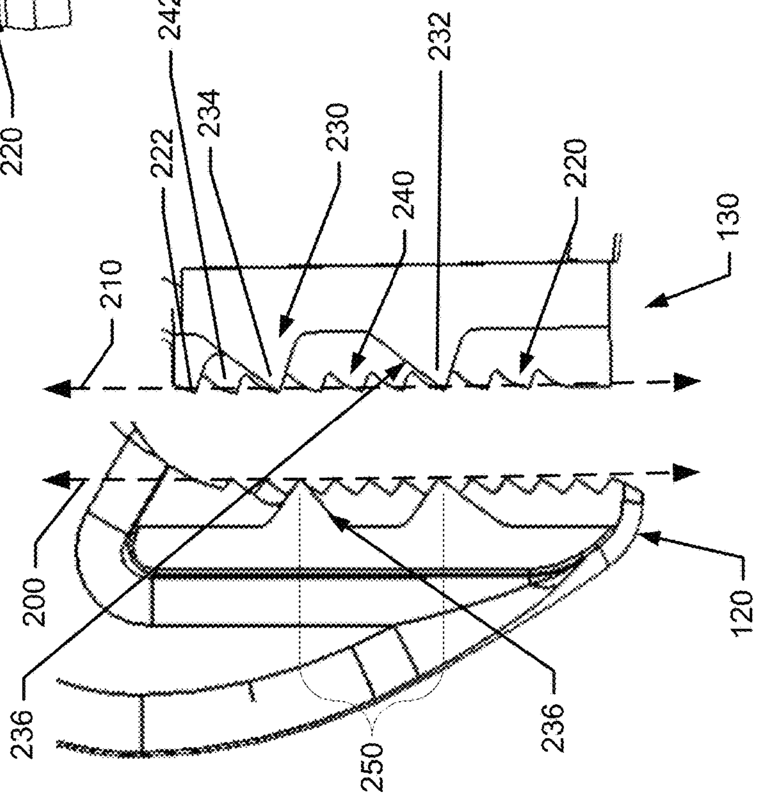
FIG. 3 is side view of the jaw assembly to show a teeth profile of each of a movable jaw and a fixed jaw of the jaw assembly in accordance with an example embodiment.

FIGS. 1 and 2 each illustrate slightly different perspective views of a hand tool 100 (e.g., a pipe wrench) having a jaw assembly 110 of an example embodiment. FIG. 3 is side view of the jaw assembly 110 to show a teeth profile of each of a movable jaw 120 and a fixed jaw 130 of the jaw assembly 110. FIG. 4 a perspective view of the fixed jaw 130 of the hand tool 100 of FIGS. 1 and 2, and FIG. 5 is a perspective view of the movable jaw 120 of the hand tool 100 of FIGS. 1 and 2. FIG. 6 is a front perspective view of an array of teeth of one of the jaws.

Referring now to FIGS. 1-6, the hand tool 100 may include a working end 102 and a handle section 104. The working end 102 may include the jaw assembly 110. The jaw assembly may further include a top jaw (i.e., movable jaw 120) and a bottom jaw (i.e., fixed jaw 130). The handle section 104 of the hand tool 100 may be considered a proximal end of the hand tool 100 when grasped by a user. Meanwhile, the working end 102 may be considered a distal end of the hand tool 100, again from the perspective of the user while grasping the hand tool 100.

The handle section 104 may extend along a longitudinal axis 106 of the hand tool 100 and, in this example, the jaw assembly 110 may also be formed along the longitudinal axis 106 of the hand tool 100. The movable jaw 120 may be disposed at a distal end of the hand tool 100, and the fixed jaw 130 may be disposed proximate to a distal end of the handle section 104. More specifically, the movable jaw 120 may be disposed at a distal end of an extension arm 140 that is movable relative to a retention housing 150 formed at a distal end of the handle section 104, and proximate to the fixed jaw 130. The retention housing 150 may include an orifice through which a portion of the extension arm 140 may pass. The extension arm 140 may include threads 160 that engage an adjustment member 170 that is rotatably retained proximate to the retention housing 150. The adjustment member 170 may be an annular component including threads that are oriented inwardly toward an axis of the adjustment member 170. The threads of the adjustment member 170 may engage the threads 160 of the extension arm 140. By moving the adjustment member 170 in the directions of double arrow 180, the internal threads of the adjustment member 170 may interact with the threads 160 on the extension arm 140 to move the extension arm 182 in a respective one of the directions shown by double arrow 182. Accordingly, a span 190 defined between the movable jaw 120 and the fixed jaw 130 may be adjusted.

In a typical situation, the span 190 may be adjusted by rotating the adjustment member 170 to extend the extension arm 140 until the span 190 is larger than an external diameter of a pipe (or other media) that is to be engaged by the hand tool 100. The adjustment member 170 may then be rotated in the opposite direction to reduce the span 190 until the movable jaw 120 and the fixed jaw 130 engage opposite sides of the media. Teeth of the movable jaw 120 and the fixed jaw 130 may, in some cases, grasp or otherwise get a bite on the opposite sides of the media. The handle section 104 may then be pushed or pulled in the directions shown by double arrow 192 to pivot the hand tool 100 about pivot axis 195, which may be defined near the center of the span 190. The length of the handle section 104, and the distance from the fixed jaw 130 to the pivot axis 195 therefore substantially defines the length of the lever arm formed for operation of the hand tool 100 to turn the media that is placed within the span 190.

As noted above, each of the fixed jaw 130 and the movable jaw 120 may be defined, at least in part, by an array of teeth. As can be appreciated from FIGS. 3-6, the teeth may be formed as a series of ridges that extend substantially parallel to each other. Each tooth may therefore be a single ridge extending in a direction substantially parallel to the pivot axis 195. In some cases, each of the ridges or teeth may be defined by a linearly extending apex and sidewalls that extend away from the apex in opposite directions. The sidewalls may have equal or slightly different slopes in some cases. For example, in the embodiment depicted in FIG. 3, ridges on the movable jaw 120 may be formed to be substantially triangular in shape with slopes of each sidewall being substantially equal. Meanwhile, ridges on the fixed jaw 130 may be slightly different in shape. In this regard, for example, the ridges on the fixed jaw 130 may have a higher slope on one side than the other, and in some cases, the sidewall with the lower slope may also have some slight curvature thereto, creating a curved saw tooth profile. However, it should be appreciated that some embodiments may mirror the teeth exactly, or nearly exactly instead of having this diversity of slopes on the sidewalls.

As shown in FIG. 3, which shows the arrays of teeth of both the movable jaw 120 and the fixed jaw 130 in profile (i.e., a side view thereof), an apex of all of the teeth of the movable jaw 120 may lie in a first plane 200 and an apex of all of the teeth of the fixed jaw may lie in a second plane 210. The first and second planes 200 and 210, which are each perpendicularly extending out of the page toward the viewer in FIG. 3, are substantially parallel to each other. By having the apexes of all of the teeth lie in the first and second planes 200 and 210, respectively, the fixed jaw 130 and the movable jaw 120 can also effectively grasp media having opposing flat surfaces (e.g., a hex nut or a square nut). Meanwhile, the teeth also enable the jaw assembly 110 to grasp or get a bite on media that is not flat (and is possibly round or even irregularly shaped). In this regard, for media that is round, for example, a full length of the apexes of several of the teeth will engage the outer diameter of the media to provide a good grip or bite on the media. Moreover, for at least some teeth, at least a portion of the sidewalls of the ridges leading up to the apex may also engage the media along a length of the corresponding teeth.

In each of the instances described in the preceding paragraph, the general expectation is that the media will have an axis that substantially aligns with the pivot axis 195. In other words, the media generally extends through the span 190 at an angle that is substantially perpendicular to the longitudinal axis 106 of the hand tool 100. However, in a side bite situation (as shown in FIGS. 7-10), if all of the teeth of both the movable jaw 120 and the fixed jaw 130 were identical in width, depth and height, only the apexes of opposing extreme ends of some of the teeth would actually contact the media (i.e., not the full length of the apexes of the ridges). More specifically, the apexes of opposite longitudinal ends to two adjacent teeth would contact the media. Although there may be four points of contact, the two points of contact on each opposing side are so close to each other that the grip strength that can be provided is small due to the fact that there is minimal contact, and that such contact is effectively in only two locations on the media. This provision of very minimal contact with the media could result in the marring or galling of the external surface of the media, while possibly also rendering the hand tool 100 ineffective at gripping, much less turning, the media.

To provide increased side bite capability, example embodiments may equip the movable jaw 120 and the fixed jaw 130 with a set of teeth that is both wider and deeper than a majority of the teeth that form the array of teeth of each respective one of the movable jaw 120 and the fixed jaw 130. Such a set of teeth (i.e., wider and deeper) may generally provide a slightly different shape and therefore also function than adjacent teeth. FIGS. 3-6 will now be referenced primarily to describe the structure of the arrays of teeth of each of the movable jaw 120 and the fixed jaw 130 of an example embodiment.

The arrays of teeth that form the movable jaw 120 and the fixed jaw 130 may mirror each other about the pivot axis 195 to at least some degree. As such, individual numbers of teeth and the shapes and positions thereof may be slightly different in some cases. However, in an example embodiment, each of the arrays of teach on the movable jaw 120 and the fixed jaw 130, respectively, may include at least a first set of teeth 220 and a second set of teeth 230, where the second set of teeth 230 is wider and deeper than the first set of teeth 220. Some example embodiments may further include a third set of teeth 240 that is even narrower than the first set of teeth 220, but otherwise generally shares the same depth as the first set of teeth 220.

As best seen in FIG. 3, the first set of teeth 220 and the third set of teeth 240 may each have a depth (D1) measured from an apex of each tooth to a valley between adjacent ridges or teeth of the corresponding set of teeth. Meanwhile, the second set of teeth 230 has a depth (D2) that is deeper than the depth (D1) of the first set of teeth 220 and the third set of teeth 240. In some cases, the depth (D2) may be at least twice as large as the depth (D1). Moreover, in this example, the depth (D2) may be about three times as large as the depth (D1). Thus, while apexes of all teeth are substantially aligned (e.g., lying in the first and second planes 200 and 210 for the movable jaw 120 and the fixed jaw 130, respectively), the valleys of the second set of teeth 230 extend substantially deeper than valleys of the first set of teeth 220 and the third set of teeth 240. As noted above, the slopes of the sets of teeth on respective ones of the movable jaw 120 and the fixed jaw 130 may also be different. However, it is the depths and therefore the lengths of the sidewalls that are of greater interest for purposes of appreciating the improved functionality that is provided by this wider and deeper set of teeth that form the second set of teeth 230.

As best seen in FIG. 6, the first set of teeth 220, the second set of teeth 230, and the third set of teeth 240 each have different widths. In this regard, a width (W1) of the first set of teeth 220 is larger than a width (W3) of the third set of teeth 240. However, a width (W2) of the second set of teeth 230 is larger than the width (W1) of the first set of teeth 220 (and therefore also larger than the width (W3) of the third set of teeth 240). As can be appreciated from FIG. 6, the widths (W1, W2 and W3) of the first, second and third sets of teeth 220, 230 and 240 are defined by the respective lengths of the ridges that form each corresponding set of teeth.

In an example embodiment, the first and third sets of teeth 220 and 240 may include some teeth or ridges that are formed consecutively or immediately adjacent to other teeth or ridges within the same respective set of teeth. In other words, some of the teeth of the first set of teeth 220 are immediately adjacent to other teeth of the first set of teeth 220 and some teeth of the third set of teeth are immediately adjacent to other teeth of the third set of teeth 240. However, this is not the case with the second set of teeth 230. Instead, each of the teeth of the second set of teeth 230 are not adjacent to another tooth of the same set of teeth. As such, each tooth of the second set of teeth 230 is necessarily spaced apart from a next tooth of the same set such that teeth from another set are interposed therebetween. In this example, the second set of teeth 230 includes a first tooth 232 and a second tooth 234 that are spaced apart from each other by at least three teeth of the third set of teeth 240.

Although not required, in the example of FIGS. 1-6, each of the first, second and third sets of teeth 220, 230 and 240 includes at least one tooth of another set interposed between at least two teeth of the respective set. For example, the third set of teeth 240 includes three teeth interposed between the first tooth 232 and the second tooth 234 of the second set of teeth 230, but also includes a fourth tooth 242 that is disposed outside the region formed between the first tooth 232 and the second tooth 234 of the second set of teeth 230. In this example, the fourth tooth 242 is disposed proximate to the second tooth 234 of the second set of teeth 230, opposite the side of the second tooth 234 that faces the first tooth 232. Similarly, the first set of teeth 220 includes a remote tooth 222 that is separated from other teeth of the first set of teeth 220 by all of the teeth of each of the second set of teeth 230 and the third set of teeth 240.

Accordingly, in some examples, teeth of the first set of teeth 220 may be disposed at longitudinal ends of the array of teeth, and teeth of the second set of teeth 230 and the third set of teeth 240 may be interposed therebetween. Furthermore, teeth of the third set of teeth 240 may be interposed between teeth of the second set of teeth 230. Teeth of the third set of teeth 240 may also extend from the first tooth 232 of the second set of teeth 230 to a point beyond the second tooth 234 of the second set of teeth 230. As can be appreciated from FIGS. 3-6, this arrangement creates a relatively large area of exposure at each of the longitudinal ends of the sidewalls 236 of the first and second teeth 232 and 234 of the second set of teeth 230. The depth (D2) of the sidewalls 236, the spacing between the first tooth 232 and the second tooth 234, and the fact that the third set of teeth 240 has a much smaller width (W3) than the width (W2) of the second set of teeth 230 further facilitate exposing the large surface area of the sidewalls 236. Regardless of whether the sidewalls 236 themselves actually contact the media, at least a bite span 250 defined between consecutive teeth that contact the media will be substantially increased. This may allow grip forces to be exerted on the periphery of the media other than effectively at just two points on opposite sides of the media. Instead, the increased bite span 250 may spread out the range over which the media is gripped and thereby allow even side bite situations to result in a good grip on the media without damaging the media. Accordingly, when media is placed in the span 190 at an angle other than about 90 degrees relative to the longitudinal axis 106 of the hand tool 100, an improved side bite may be obtained, as shown in FIGS. 7-10.

In this regard, FIGS. 7-10 show media 300 (e.g., a pipe or portion thereof) having an axis 310 (or longitudinal centerline) that is not coaxial with the pivot axis 195, and therefore also not at about 90 degrees relative to the longitudinal axis 106 of the hand tool 100. An angular difference (a) may be defined between the axis 310 of the media and the longitudinal axis. The angular difference (a) means that instead of a full length of multiple apexes of the teeth engaging an exterior surface of the media 300, only the opposite end portions of some of the teeth will engage the exterior surface of the media. By employing the second set of teeth 230, and particularly due to the increased bite span 250 between the first tooth 232 and the second tooth 234 of the second set of teeth 230, the grip may be improved in spite of the angular difference ($\alpha$).

In some example embodiments, the second set of teeth 230 may improve grip strength so that angular differences ($\alpha$) of about 30 degrees or more may be effectively tolerated while still enabling good grip strength on the media 300 to enable gripping and/or turning of the media 300 without marring or galling the external surface of the media 300. Furthermore, in some cases, a larger portion of one or both of the sidewalls 236 of the first and second teeth 232 and 234 of the second set of teeth 230 may contact the media 300 due to the increased size of the bite span 250 relative to the very small bite span that otherwise exists between adjacent teeth. At least four contact points spaced apart from each other by at least the bite span 250 may therefore be created and, in some cases, a portion of at least one or more than one of the sidewalls may also contact the outer surface of the media 300.

FIGS. 11 and 12 illustrate an adjustable grip pliers with straight jaws and FIGS. 13 and 14 illustrate an adjustable grip pliers with a V-shaped recessed portion in the jaws. In this regard, pliers 500 of FIGS. 11 and 12 includes a first member 510 and a second member 520 operably coupled to each other via a tongue-and-groove assembly 525. The side bite spanning features described above are implemented in straight jaws 530 and best seen in FIGS. 12A and 12B. Similarly, pliers 600 of FIGS. 13 and 14 includes a first member 610 and a second member 620 operably coupled to each other via a tongue-and-groove assembly 625. The side bite spanning features described above are implemented in V-shaped recessed jaws 630 and best seen in FIGS. 14A and 14B.

As can be appreciated from the example of FIGS. 1-10, example embodiments may define a hand tool with an improved capability for grasping media in a side bite situation. For example, the hand tool may include a handle section, a working end operably coupled to the handle section, and a jaw assembly disposed at the working end. The jaw assembly may include a movable jaw and a fixed jaw. A span defined between the movable jaw and the fixed jaw may be adjustable. Each of the movable jaw and the fixed jaw may include an array of teeth defined by ridges that extend substantially parallel to each other. The array of teeth on each of the fixed jaw and the movable jaw may include a first set of teeth having a first width and a first depth, and a second set of teeth having a second width and a second depth. The first depth may be less than the second depth and the first width is less than the second width.

The hand tool and/or its components may include a number of modifications, augmentations, or optional additions, some of which are described herein. The modifications, augmentations or optional additions may be added in any desirable combination. For example, the array of teeth on each of the fixed jaw and the movable jaw further may include a third set of teeth having a third width and the first depth. The third width may be less than both the first width and the second width. In an example embodiment, a plurality of teeth of the third set of teeth may be disposed between a first tooth of the second set of teeth and a second tooth of the second set of teeth. In some cases, at least one tooth of the third set of teeth may not be disposed between the first tooth and the second tooth. In an example embodiment, the first set of teeth may include at least one tooth on each end thereof between which all teeth of the first set of teeth and the third set of teeth are disposed. In some cases, an apex of each tooth in the array of teeth may be equidistant from an adjacent apex of each adjacent tooth regardless of whether the adjacent apex is on a tooth of the first, second or third sets of teeth. In an example embodiment, sidewalls of teeth in the array of teeth on the movable jaw have a first slope, and sidewalls of teeth in the array of teeth on the fixed jaw have a second slope, and the first slope and the second slope may be different. In some cases, one of the first slope and the second slope may include a curved surface. In an example embodiment, sidewalls of teeth in the array of teeth on one of the movable jaw or the fixed jaw may have a first slope away from the apex in a first direction, and a second slope away from the apex in a second direction, and the first slope and the second slope may be different. In some cases, apexes of each tooth of the array of teeth on the fixed jaw lie in a first plane and apexes of each tooth of the array of teeth on the movable jaw lie in a second plane. In an example embodiment, the first and second planes may be substantially parallel to each other over a range of distances defining the span. In some cases, the hand tool may be a pipe wrench. However, if employed in a pliers or other wrench, example embodiments may have two movable jaws and the apexes of the teeth in one or both jaws may not necessarily be in the same plane.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand tool comprising:

a handle section;

a working end operably coupled to the handle section; and a jaw assembly disposed at the working end, the jaw assembly comprising a first jaw and a second jaw, wherein a span defined between the first jaw and the second jaw is adjustable, wherein each of the first jaw and the second jaw includes an array of teeth defined by ridges that extend substantially parallel to each other, wherein the array of teeth on each of the first jaw and the second jaw includes a narrower set of teeth having a first width and a first depth, and a wider set of teeth having a second width and a second depth, wherein the first depth is less than the second depth and the first width is less than the second width, and wherein a plurality of teeth of the narrower set of teeth are disposed between a first tooth of the wider set of teeth and a second tooth of the wider set of teeth.

2. The hand tool of claim 1, further comprising:

an intermediate-width set of teeth having a third width and a third depth, wherein the third width is between the first width and the second width.

3. The hand tool of claim 2, wherein the third depth is the same depth as the first depth.

4. The hand tool of claim 1, wherein apexes of the first tooth of the wider set and the second tooth of the wider set lie in the same plane as apexes of the plurality of teeth of the narrower set of teeth that are disposed between the first tooth and the second tooth of the wider set of teeth.

5. The hand tool of claim 1, wherein the wider set of teeth and the narrower set of teeth are centered on the jaw such that a halfway point on each of the ridges of the wider set of teeth lie in the same plane as a halfway point on each of the ridges of the narrower set of teeth, and such that the wider set of teeth extend equally beyond both extreme ends of the narrower set of teeth.

6. The hand tool of claim 1, wherein the jaws are configured to grip a cylindrical media extending through the jaws perpendicular to a longitudinal axis of the hand tool by at least the ridges of two teeth of the narrower set of teeth of each jaw contacting the cylindrical media with a first bite span, and wherein the jaws are configured to grip a cylindrical media extending through the jaws at an angular difference from perpendicular to a longitudinal axis of the hand tool by at least extreme ends of two teeth of the wider set of teeth of each jaw contacting the cylindrical media with a second bite span wider than the first bite span.

7. The hand tool of claim 6, wherein the angular difference is at least 30 degrees.

8. The hand tool of claim 1, wherein apexes of each tooth of the array of teeth on the first jaw lie in a first plane and apexes of each tooth of the array of teeth on the second jaw lie in a second plane.

9. The hand tool of claim 8, wherein the first and second planes are substantially parallel to each other over a range of distances defining the span.

10. The hand tool of claim 1, wherein the hand tool comprises a pipe wrench, wherein the first jaw and the second jaw slide relative to each other to adjust the span.

11. The hand tool of claim 1, wherein the hand tool comprises pliers, wherein the first jaw and the second jaw pivot relative to each other to adjust the span.

12. The hand tool of claim 11, wherein the hand tool comprises adjustable pliers wherein the first jaw and the second jaw can slide and pivot relative to each other to adjust the span.

13. The hand tool of claim 12, wherein the jaws are V-shaped.

14. The hand tool of claim 1, wherein at least three teeth of the narrower set of teeth are disposed between the first tooth of the wider set of teeth and the second tooth of the wider set of teeth.

15. A hand tool comprising:

a handle section having a longitudinal axis;

a working end operably coupled to the handle section; and a jaw assembly disposed at the working end, the jaw assembly comprising a first jaw and a second jaw, wherein a span defined between the first jaw and the second jaw is adjustable, wherein each of the first jaw and the second jaw includes an array of teeth defined by ridges that extend substantially parallel to each other and substantially perpendicular to the longitudinal axis of the handle, and wherein the array of teeth on each of the first jaw and the second jaw includes a set of teeth that are both wider and deeper than a majority of the teeth that form the array of teeth of each respective one of the first jaw and the second jaw; and wherein at least one tooth of the majority of teeth is located between two of the wider teeth.

16. The hand tool of claim 15, wherein the hand tool is a pipe wrench.

17. The hand tool of claim 15, wherein the hand tool is an adjustable plier.

18. A hand tool comprising:

a handle section comprising a longitudinal axis;

a working end operably coupled to the handle section; and a jaw assembly disposed at the working end, the jaw assembly comprising a first jaw and a second jaw, wherein a span defined between the first jaw and the second jaw is adjustable, wherein each of the first jaw and the second jaw includes an array of teeth defined by ridges that extend substantially parallel to each other and substantially perpendicular to the longitudinal axis of the handle, wherein the array of teeth on each of the first jaw and the second jaw includes:

a first set of teeth having a first width and a first depth, and a second set of teeth that extend beyond the first width of the first set of teeth and have a second depth deeper than the first depth, and wherein at least two teeth of the first set of teeth are disposed between two teeth of the second set of teeth.

19. The hand tool of claim 18, wherein the array of teeth on the first and second jaws are configured such that:

the first set of teeth grip a cylindrical object perpendicular to the longitudinal axis of the handle with a first bite span, and the second set of teeth grip the cylindrical object with a second bite span larger than the first bite span when the cylindrical object is angled away from perpendicular.

20. The hand tool of claim 18, further comprising:

a third set of teeth disposed outside the two teeth of the second set of teeth, wherein the third set of teeth has a width that is wider than the first set of teeth and narrower than the second set of teeth.

* * * * *